(12) United States Patent
Melanson et al.

(10) Patent No.: US 7,192,547 B2
(45) Date of Patent: Mar. 20, 2007

(54) METHOD FOR MANUFACTURING A GOLF PRODUCT

(75) Inventors: David M. Melanson, Northampton, MA (US); Thomas A. Veilleux, Charlton, MA (US); Vincent J. Simonds, Brimfield, MA (US); Michael J. Tzivanis, Chicopee, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 11/275,526

(22) Filed: Jan. 12, 2006

(65) Prior Publication Data

US 2006/0091587 A1    May 4, 2006

(51) Int. Cl.
*B29C 45/18* (2006.01)
(52) U.S. Cl. .................. 264/328.6; 264/328.1
(58) Field of Classification Search .............. 264/328.6
See application file for complete search history.

(56) References Cited

U.S. PATENT DOCUMENTS

| | | | |
|---|---|---|---|
| 4,189,070 A | * | 2/1980 | Macosko et al. ........... 222/134 |
| 4,426,348 A | * | 1/1984 | Salisbury ................. 264/328.6 |
| 5,356,941 A | | 10/1994 | Sullivan et al. |
| 5,498,151 A | * | 3/1996 | Nennecker .................. 425/4 R |
| 5,562,883 A | * | 10/1996 | Salisbury et al. ........... 422/133 |
| 6,287,217 B1 | | 9/2001 | Sullivan et al. |
| 6,290,614 B1 | | 9/2001 | Kennedy, III et al. |
| 6,309,313 B1 | | 10/2001 | Peter |
| 6,533,566 B2 | | 3/2003 | Tzivanis et al. |
| 6,645,088 B2 | | 11/2003 | Wu et al. |
| 6,663,508 B1 | | 12/2003 | Keller et al. |
| 6,685,579 B2 | | 2/2004 | Sullivan |
| 6,716,954 B2 | | 4/2004 | Keller et al. |
| 6,755,634 B2 | | 6/2004 | Tzivanis et al. |
| 6,787,091 B2 | | 9/2004 | Dalton et al. |
| 2002/0016435 A1 | | 2/2002 | Simonutti et al. |

* cited by examiner

*Primary Examiner*—Christina Johnson
*Assistant Examiner*—Monica A Huson
(74) *Attorney, Agent, or Firm*—Michael A. Catania; Elaine H. Lo

(57) ABSTRACT

A process for reaction injection molding a polyurethane material for a layer of a golf ball is disclosed herein. The layer is preferably a cover for the golf ball. The process discloses preferred pressure parameters and mass flow parameters for reaction injection molding the layer. Such preferred pressure parameters include the difference from mix-head open to the shot mid-point, $\Delta\Delta P_{om}$, and the pressure difference from mix-head open to close, or $\Delta\Delta P_{oc}$. The mass flow parameters include the percentage change in mass flow ratio from mix-head open to shot mid-point, or % $MFR_{om}$, and the change in mass flow ratio from mix-head open to shot mid-point, or $\Delta MFR_{om}$.

19 Claims, 13 Drawing Sheets

METHOD FOR MANUFACTURING A GOLF PRODUCT

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a process for manufacturing a layer of a golf ball. More specifically, the present invention relates to a process for reaction injection molding a layer of a golf ball.

2. Description of the Related Art

Reaction injection molding ("RIM") is a process used to make golf ball components, such as one-piece balls, covers, cores, and inner layers. Highly reactive liquids are injected into a closed mold, mixed usually by impingement and/or mechanical mixing in an in-line device such as a "peanut mixer", and polymerized primarily in the mold to form a coherent, molded article. When used to make a thermoset polyurethane or polyurea component, RIM usually involves a rapid reaction between two types of reactants: (a) a polyol or other material with an active hydrogen, such as a polyfunctional alcohol or amine (hereinafter referred to as "polyol" or "POLY"); and (b) an isocyanate-containing compound (hereinafter referred to as "isocyanate" or "ISO"). The reactants are stored in separate tanks prior to molding and maybe first mixed in a mix-head upstream of a mold and then injected into the mold. The liquid streams are metered in the desired weight to weight ratio and fed into an impingement mix-head, with mixing occurring under high pressure, e.g., 1500 to 3000 pounds per square inch ("psi"). The liquid streams impinge upon each other in the mixing chamber of the mix-head and the mixture is injected into the mold. One of the liquid streams typically contains a catalyst for the reaction. The reactants react rapidly after mixing to gel and form polyurethane or polyurea polymers.

RIM offers several advantages over conventional, injection and compression molding techniques for producing golf products and/or equipment. For example, in the RIM process, the reactants are simultaneously mixed and injected into the mold, forming the desired component. In conventional techniques, the reactants must first be mixed in a mixer separate from the molding apparatus, then added into the apparatus. In such a process, the mixed reactants first solidify and must later be melted in order to properly mold the desired components, etc.

Additionally, the RIM process requires lower temperatures and pressures during molding than injection or compression molding. Under the RIM process, the molding temperature is maintained from about 90 to about 180° F., and usually at about 100–160° F., in order to ensure proper injection viscosity. Compression molding is typically completed at a higher molding temperature of about 320° F. (160° C.) while injection molding is completed at an even higher temperature range of 392–482° F. (200–250° C.). Molding at a lower temperature is beneficial when, for example, the cover is molded over a very soft core so that the very soft core does not melt or decompose during the molding process.

Moreover, the RIM process creates more favorable durability properties in a golf ball component than conventional techniques. For example, a golf ball cover produced by a RIM process has a uniform or "seamless" cover in which the properties of the cover material in the region along the parting line are generally the same as the properties of the cover material at other locations on the cover, including at the poles. The improvement in durability is due to the fact that the reaction mixture is distributed uniformly into a closed mold. This uniform distribution of the injected materials reduces or eliminates knit-lines and other molding deficiencies which can be caused by temperature differences and/or reaction differences in the injected materials. The RIM process results in generally uniform molecular structure, density and stress distribution as compared to conventional injection molding processes, where failure along the parting line or seam of the mold can occur because the interfacial region is intrinsically different from the remainder of the cover layer and, thus, can be weaker or more stressed.

Furthermore, the RIM process is relatively faster than conventional techniques. In the RIM process, the chemical reaction usually takes place in under 5 minutes, typically in less than two minutes, sometimes in under one minute and, in many cases, in about 30 seconds or less. The demolding time may be 10 minutes or less. The molding process for the conventional methods itself typically takes about 15 minutes. Thus, the overall speed of the RIM process makes it advantageous over the injection and compression molding methods.

Several patents disclose the use of RIM utilized for golf balls. One of the earliest disclosures of RIM is U.S. Pat. No. 5,356,941 to Sullivan et al., for Game Balls having Improved Core Compositions, which discloses the use of RIM.

Further discloses are set forth in U.S. Pat. No. 6,803,119 to Sullivan et al., for a Multi-Layer Golf Ball, and U.S. Pat. No. 6,287,217 to Sullivan et al., for Multi-Layer Golf Ball, both which disclose the use of a BAYFLEX RIM polyurethane as a cover for a golf ball.

A further disclosure is set forth in U.S. Pat. No. 6,290,614 to Kennedy III et al., for a Golf Ball Which Includes Fast-Chemical-Reaction-Produced Component And Method Of Making Same, which discloses a RIM process in which the temperature is 90–180° F., and the pressure is 200 pounds per square inch ("psi") or less, and the processing time is 10 minutes or less, and preferably 30 second or less. This patent further discloses that the mix head pressure is between 1500 to 3000 psi.

A further disclosure is set forth in U.S. Pat. No. 6,533,566 to Tzivanis et al., for an Apparatus For Making A Golf Ball, which discloses a turbulence inducing mold for a RIM process.

A further disclosure is set forth in U.S. Pat. No. 6,290,614 to Kennedy II et al., for a Multi-Layer Golf Ball, which discloses a RIM system utilized for a cover of a golf ball.

Another disclosure is U.S. Pat. No. 6,309,313 to Peter, for a Low Cost, Resilient, Shear Resistant Polyurethane Elastomers For Golf Ball Covers, which discloses using RIM at temperatures of 120–250° F.

Yet a further disclosure is set forth in U.S. Pat. No. 6,645,088 to Wu et al., for Reaction Injection Moldable Compositions, Methods For Making Same, And Resultant Golf Articles, which discloses the use of a material with a viscosity less than 20,000 cPs, and an injection pressure less than 2500 psi.

Yet a further disclosure is set forth in U.S. Pat. No. 6,663,508 to Keller et al., for Multi-Layer Golf Ball With Reaction Injection Molded Polyurethane Component, which discloses the use of a BAYFLEX MP-10,000 RIM system which operates at 10–5 mmHg at 77° F. and has a molecular weight of 600–700.

Yet a further disclosure is set forth in U.S. Pat. No. 6,685,579 to Sullivan, for Multi-Layer Cover Polyurethane Golf Bal, which discloses the use of a RIM with a material having a viscosity up to 200 cPs and pressures of 2000 to 2500 psi.

Yet a further disclosure is set forth in U.S. Pat. No. 6,716,954 to Keller et al., for a Golf Ball Formed From A Polyisocyanate Copolymer And Method Of Making Same, which discloses the use of DESMODUR HL material which has a NCO content of 10–11%.

A further disclosure is set forth in U.S. Pat. No. 6,755,634 to Tzivanis et al., for an Apparatus For Forming A Golf Ball With Deep Dimples, which discloses an apparatus capable of using RIM at temperatures of 50–250° F., pressures of 100 psi or less, and an impingement pressure of 150–195 bars.

A further disclosure is set forth in U.S. Pat. No. 6,787,091 to Dalton et al., for a Reaction Injection And Compression Molding Of A Golf Ball, which discloses a reaction injection compression molding RCIM process which operates at an impingement head pressure of 1000 to 5000 psi.

Another disclosure is U.S. Patent Publication Number 2002/0016435 to Simonutti et al., for a Method OF Making A Golf Ball Product From Fast-Curing Reaction Injection Molded Polyurethane, which discloses a RIM process with an isocyanate temperature of 100–130° F., a polyol temperature of 100–130° F., a raw material tank pressure of 40–80 psi, an isocyanate pressure of 1000–3000 psi, polyol pressure of 1000–3000, mold temperature of 130–200° F., and an inject time of less ten seconds.

The term "demold time" generally refers to the mold release time, which is the time span from the mixing of the components until the earliest possible time at which the part may be removed from the mold. At that time of removal, the part is said to exhibit sufficient "green strength." The term "reaction time" generally refers to the setting time or curing time, which is the time span from the beginning of mixing until the time at which the product no longer flows. Further description of the terms setting time and mold release time are provided in the "Polyurethane Handbook," edited by Gunter Oertel, Second Edition, ISBN 1-56990-157-0, herein incorporated by reference in its entirety.

Although RIM has been widely used to mold large parts, it has only recently begun to be used in molding small parts, such as golf balls and golf ball components. One challenge is the relatively small shot size associated with such small parts. The small shot size demands that precise amounts of the two reactants be mixed thoroughly and consistently throughout the shot, When the amount of either reactant changes or the degree of mixing changes, the rate at which the part's hardness develops will also change and the final part hardness may be undesirable. These inferior material properties can affect, for example, a golfball's susceptibility to damage when removing the ball from the mold and the toughness of a finished golf ball in resisting scuff damage when struck by a golf club.

Another challenge is ensuring consistency in the finished product over several shot operations. Because the shot size is so small, even small changes in conditions affecting either the reactants or the RIM process itself can change the quality of the finished product.

Although quality control techniques are known, they are especially difficult to apply to golf ball components. For example, at the demold time, it is difficult to determine the quality of a RIM-produced golf ball; the earliest time when the quality can be determined is approximately 1 hour after demolding. Even then, test results may change 12 to 24 hours later as the RIM material continues to cure. Destructive testing destroys the ball and entails extra costs which must be passed on to the consumer. Balls where the mixing was poor or the mix ratio was incorrect may look and feel identical to balls with acceptable quality. As a result of the extra time incurred in detecting defective balls, a large run of unacceptable golf balls may be produced. Hence, new methods for controlling the RIM manufacturing of golf products, such as golf balls and/or components thereof, are desired.

BRIEF SUMMARY OF THE INVENTION

One aspect of the present invention is a process for reaction injection molding a layer of a golf ball. The process may be defined by component Reynold's numbers through the mixhead, impingement velocities through the mixhead, pressure changes of components within a shot, overall pressure difference between components, pressure delta delta, and mix ratio delta.

Another aspect of the present invention is a process for reaction injection molding a layer for a golf ball. The process begins with introducing a polyol component and an isocyanate component into a molding apparatus. Next, the polyol component and the isocyanate component react within the molding apparatus to create a reaction product. Next, a layer for a golf ball is formed from the reaction product. An impingement velocity for the isocyanate component ranges from 50 to 2,000 feet per second, and an impingement velocity for the polyol component ranges from 50 to 2,000 feet per second.

Yet another aspect of the present invention is a process for reaction injection molding a layer for a golfball, wherein a pressure difference $\Delta\Delta Pom$ is less than 200 psi and a change in mix ratio, % $MFRom$, from mix-head open to shot mid-point is within 20%. The process begins with introducing a polyol component and an isocyanate component into a molding apparatus. Next, a layer for a golf ball is formed from the reaction product of the polyol component and the isocyanate component.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
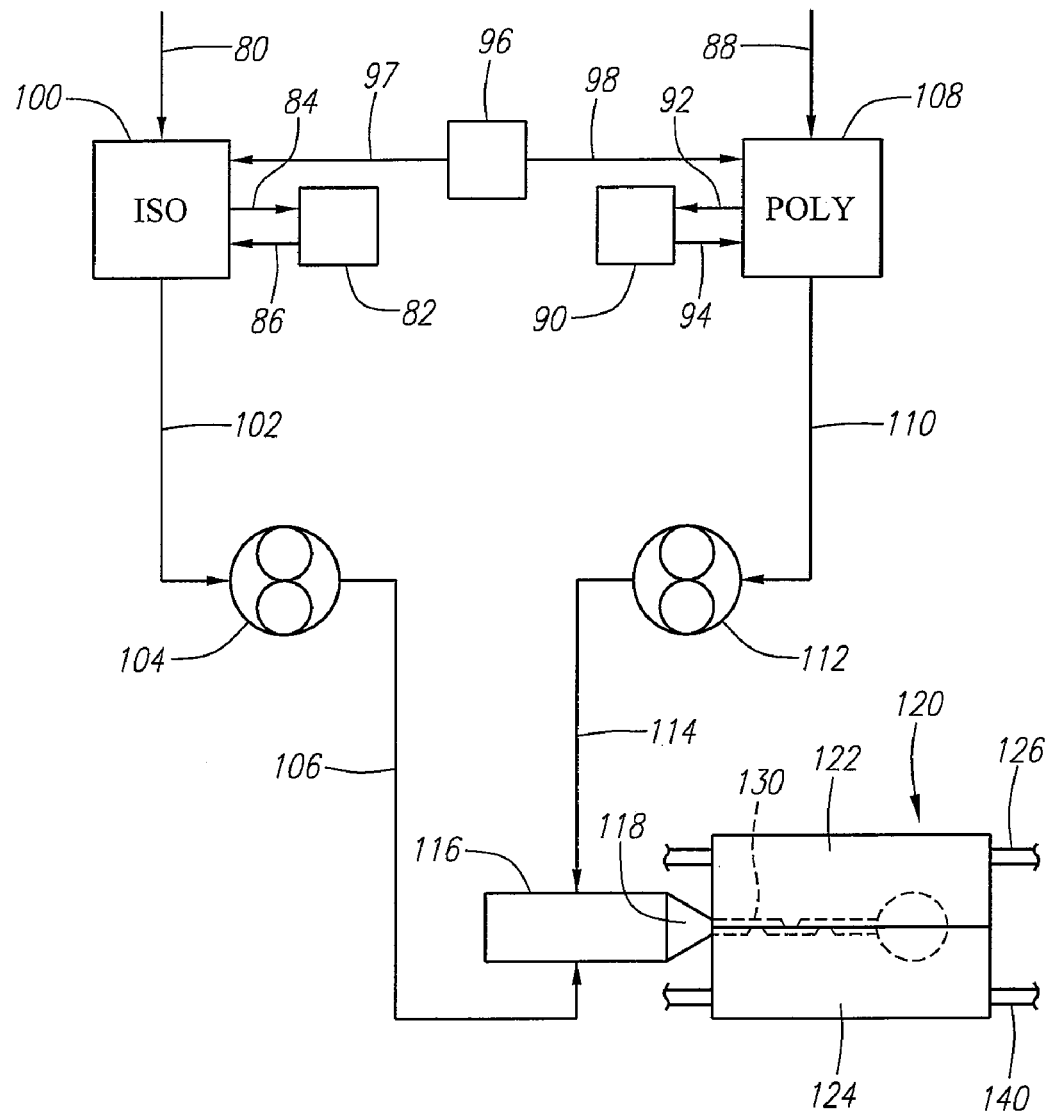
FIG. 1 shows a general RIM process flow diagram.

FIG. 1 shows a general process flow diagram for forming a polyurethane cover for a golfball utilizing a reaction injection molding ("RIM") apparatus. An isocyanate component from bulk storage is fed through line 80 to an isocyanate tank 100. The isocyanate component is heated to the desired temperature, e.g., about 90 to about 180° F., by circulating it through heat exchanger 82 via lines 84 and 86. The isocyanate component preferably comprises an isocyanate and at least one additional material.

A polyol component is conveyed from bulk storage to a polyol tank 108 via line 88. The polyol component is heated to the desired temperature, e.g. about 90 to about 180° F., by circulating it through heat exchanger 90 via lines 92 and 94. The polyol component preferably comprises a polyol and at least one additional material. Dry nitrogen gas is fed from nitrogen tank 96 to isocyanate tank 100 via line 97 and to polyol tank 108 via line 98. The isocyanate component is fed from isocyanate tank 100 via line 102 through a metering cylinder or metering pump 104 into mix-head inlet line 106. The polyol component is fed from polyol tank 108 via line 110 through a metering cylinder or metering pump 112 into mix-head inlet line 114. The mix-head 116 receives the isocyanate component and the polyol component, mixes them, and provides for them to be fed through nozzle 118 into injection mold 120. The injection mold 120 preferably has a top mold 122 and a bottom mold 124. Mold heating or cooling can be performed through lines 126 in the top mold 122 and lines 140 in the bottom mold 124. The materials are preferably maintained under controlled conditions to insure a desired pressure profile.

Inside the mix-head 116, the isocyanate component and the polyol component are directed through small orifices, or reducers, at ultra-high velocity to provide excellent mixing. Additional mixing may be conducted using an aftermixer 130, which typically is constructed inside the mold between the mix-head and the mold cavity. The reaction mixture viscosity should be sufficiently low to ensure that the empty space in the mold is completely filled.

Methods and apparatus such as described above are disclosed in greater detail in U.S. Pat. No. 6,290,614 to Kennedy III et al., for a Golf Ball Which Includes Fast-Chemical-Reaction-Produced Component And Method Of Making Same, U.S. Pat. No. 6,533,566 to Tzivanis et al., for an Apparatus For Making A Golf Ball, U.S. Pat. No. 6,663,508 to Keller et al., for Multi-Layer Golf Ball With Reaction Injection Molded Polyurethane Component, and U.S. Pat. No. 6,755,634 to Tzivanis et al., for an Apparatus For Forming A Golf Ball With Deep Dimples, all of which are hereby incorporated by reference in their entireties.

Figure 2:
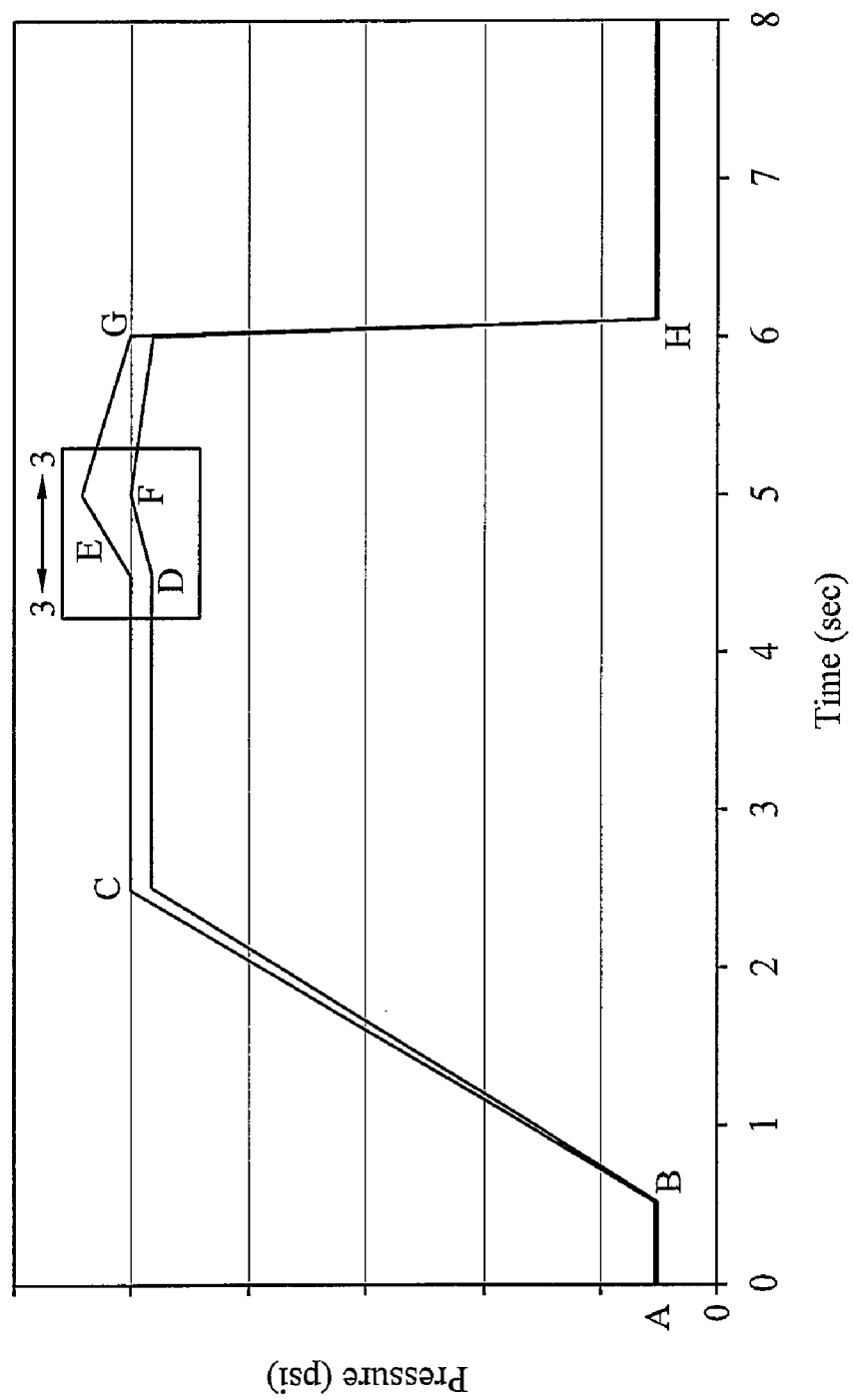
FIG. 2 shows a typical pressure profile over an entire RIM shot cycle.

FIG. 2 shows a preferred pressure profile over an entire shot cycle. At point A, the machine is in recirculation mode. At point B, the machine begins to build pressure for the shot. At point C, the machine holds at the shot pressure. At point D, the mix-head opens to dispense the shot. Point E is the midpoint of the shot. At point F, the mix-head closes to end the shot. At point G, the machine ends the hold at shot pressure. At point H, the machine is back in recirculation mode. A new shot cycle begins. Table 1 summarizes the data shown in FIG. 2.

TABLE ONE

| Label | Event |
| --- | --- |
| A | Recirculation Mode |
| B | Build Pressure for Shot |
| C | Hold at Shot Pressure |
| D | Mix-Head Opens |
| E | Midpoint of Shot |
| F | Mix-Head Closes |
| G | End Hold at Shot Pressure |
| H | Recirculation Mode |

The pressure profile for each reactant should remain constant during the actual shot itself, which occurs from point D to point F. The start pressure, or the pressure at open, occurs at point D. The final pressure, or the pressure at close, occurs at point F. In practice, this usually means the pressure profile for each reactant over the entire shot cycle should be constant. Here, "constant" means the pressure profile has the same shape, not the same value, over the shot cycle.

The start pressure for each reactant can be controlled by pressure regulators within the RIM machine. However, the final pressure is controlled by the temperature, viscosity, flow rate, and reducer size. Preferably, the temperature for each reactant is adjusted such that the two reactants have approximately the same viscosity; this allows for better mixing of the reactants. The flow rate is often controlled indirectly by hydraulic adjustments and is dependent on the viscosity of the components and the size of the orifice or reducer it must travel through. Reducers, which are components with one or more fixed-size holes located inside the mix-head, restrict the flow of the reactants and therefore raise the pressure required to dispense each reactant at a given flow rate. The reducer size can be changed to obtain the desired final pressure; e.g., larger reducers can be installed to lower the final pressure. Thus, the pressure profile for each reactant (isocyanate component and polyol component) is usually different due to balancing these variables.

The RIM molding process can be monitored and controlled by acquiring and analyzing the pressures and flow rates for each reactant and the mix ratio during the actual shot. This requires that the isocyanate component pressure, polyol component pressure, isocyanate component mass flow, polyol component mass flow, and mass ratio be collected at the start of the shot when the mix-head opens (point D), the mid-point of the shot (point E), and when the mix-head closes (point F). A preferred mixing during a shot can be determined from this data.

The pressure profile will repeat until something changes in the process; e.g. the mix-head needs cleaning, the temperature control for a reactant is drifting, . . . etc. This indicates that something has affected the mix quality and therefore part quality may suffer. When this occurs, adjustments need to be made to the system to ensure restructuring of the proper RIM pressure profile.

The process is deemed "in control" and data is collected from one or more shots to establish a baseline. The baseline data collected comprises datapoints indicating the value of one or more of the following variables: the isocyanate pressure when the mix-head opens (at point D), or Poi; the isocyanate component pressure at the midpoint of the shot (at point E), or Pmi; the isocyanate component pressure when the mix-head closes (at point F), or Pci; the polyol component pressure when the mix-head opens (at point D), or Pop; the polyol component pressure at the midpoint of the shot (at point E), or Pmp; the polyol component pressure when the mix-head closes (at point F), or Pcp; the isocyanate component mass flow rate when the mix-head opens, or MFoi; the isocyanate component mass flow rate at the mid-point of the shot, or MFmi; the isocyanate component mass flow rate when the mix-head closes, or MFci; the polyol component mass flow rate when the mix-head opens, or MFop; the polyol component mass flow rate at the mid-point of the shot, or MFmp or the polyol component mass flow rate when the mix-head closes, or MFcp. These variables are process parameters which can be used to determine the status of the process. Those skilled in the pertinent art will recognize that other variables may be measured as well. For example, it may be desirable to measure the reactant pressure when the machine begins to build pressure for the shot (at point B) and the reactant pressure when the hold at shot pressure ends (at point G). It may also be desirable to measure other variables at different locations within the RIM machine and use those variables to control the process.

From this data, several other process parameters may be determined. The average open pressure, or Poave, maybe calculated as [(Pop+Poi)/2]. The average close pressure, or Pcave, may be calculated as [(Pcp+Pci)/2]. The pressure difference at open, or $\Delta$Po, may be calculated as (Pop–Poi). The pressure difference at close, or $\Delta$Pc, may be calculated as (Pcp–Pci). The change in average pressure from open to close, or $\Delta$Pocave, may be calculated as (Pcave–Poave). The change in pressure difference from mix-head open to close, or $\Delta\Delta$Poc, may be calculated as ($\Delta$Pc–$\Delta$Po) or [(Pcp–Pci)–(Pop–Poi)]. An alternative change in pressure difference from mix-head open to the shot mid-point, or $\Delta\Delta$Pom, maybe calculated as ($\Delta$Pm–$\Delta$Po) or [(Pmp–Pmi)–(Pop–Poi)].

The change in isocyanate component mass flow rate from open to close, or $\Delta$MFoci, may be calculated as (MFci–MFoi). The change in polyol component mass flow rate from open to close, or $\Delta$MFocp, may be calculated as (MFcp–MFop). The change in mass flow ratio from mix-head open to close, or $\Delta$MFRoc, may be calculated as [(MFcp/MFci)–(MFop/MFoi)]. The percentage change in mass flow ratio from mix-head open to close, or % MFRoc, can be calculated as or $\Delta$MFRoc/(MFop/MFoi). The change in mass flow ratio from mix-head open to shot mid-point, or $\Delta$MFRom, may be calculated as [(MFmp/MFmi)–(MFop/MFoi)]. The percentage change in mass flow ratio from mix-head open to shot mid-point, or % MFRom, can be calculated as or $\Delta$MFRom/(MFop/MFoi).

The Reynold's number through the mixhead may also be calculated from the component viscosity, component density, volumetric flow rate, and the diameter of the orifice. Again, those skilled in the pertinent art will recognize that other parameters or variables may be used. For example, the average isocyanate mass flow rate during the shot could be calculated as [(MFoi+MFci)/2]. Alternatively, known constants could be used as well. For example, with knowledge of the reducer size, one could also calculate the pressure of a reactant upon impingement in the mixhead. The variables listed above may also be considered process parameters.

Figure 3:
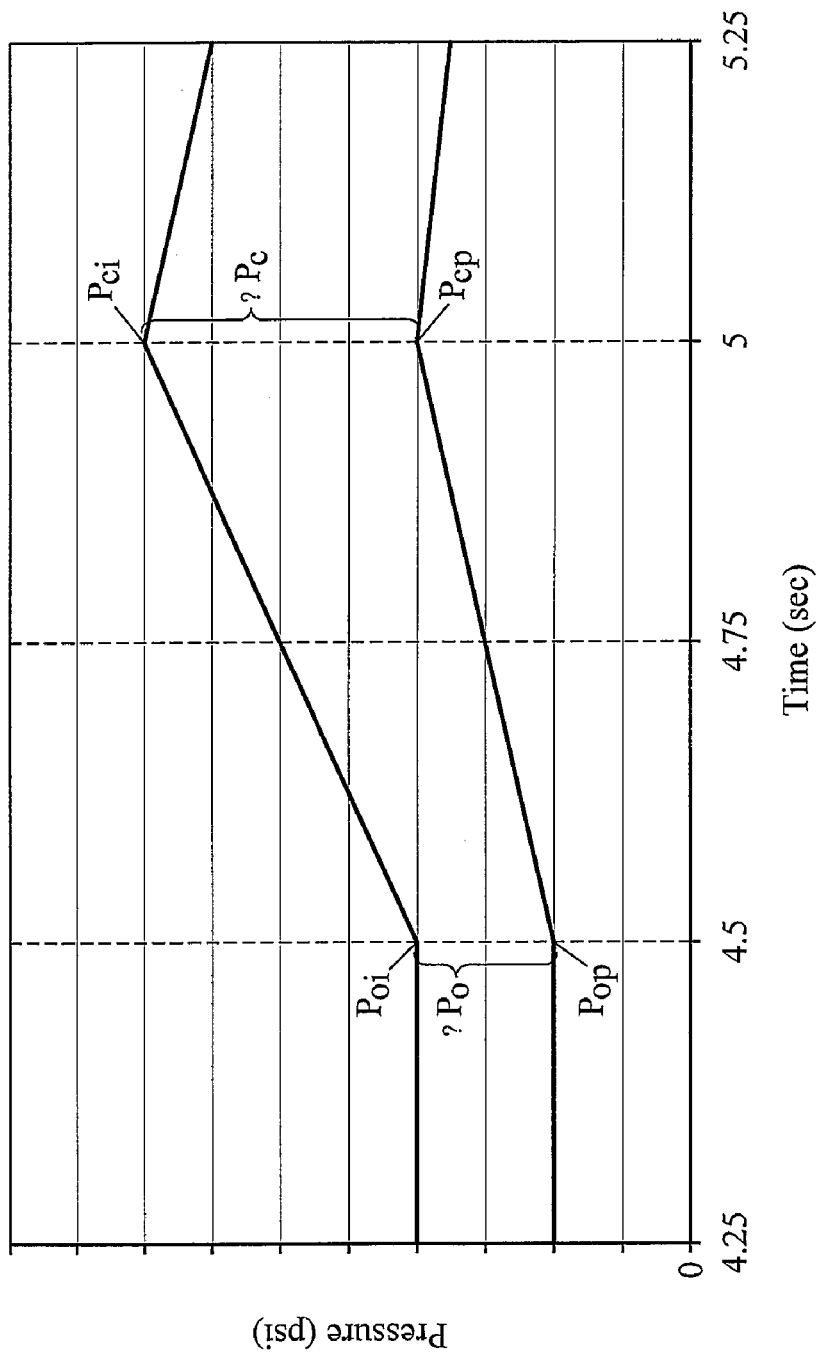
FIG. 3 shows an enlarged view of the box 3—3 in FIG. 2.

FIG. 3 is an enlarged view of the box in $\Delta$, which shows the pressure profile during the shot portion of the cycle. The pressure profile is labeled to show when the variables Poi, Pop, Pci, and Pcp and the process parameters $\Delta$Po and $\Delta$Pc are measured. Table Two uses the pressure profile given in Table One to calculate the values of the process parameters listed.

TABLE TWO

| Parameter | Value (psi) |
| --- | --- |
| $\Delta$Po | −100 |
| $\Delta$Pc | −200 |
| $\Delta$Pocave | 150 |
| $\Delta\Delta$Poc | −100 |

Figure 4:
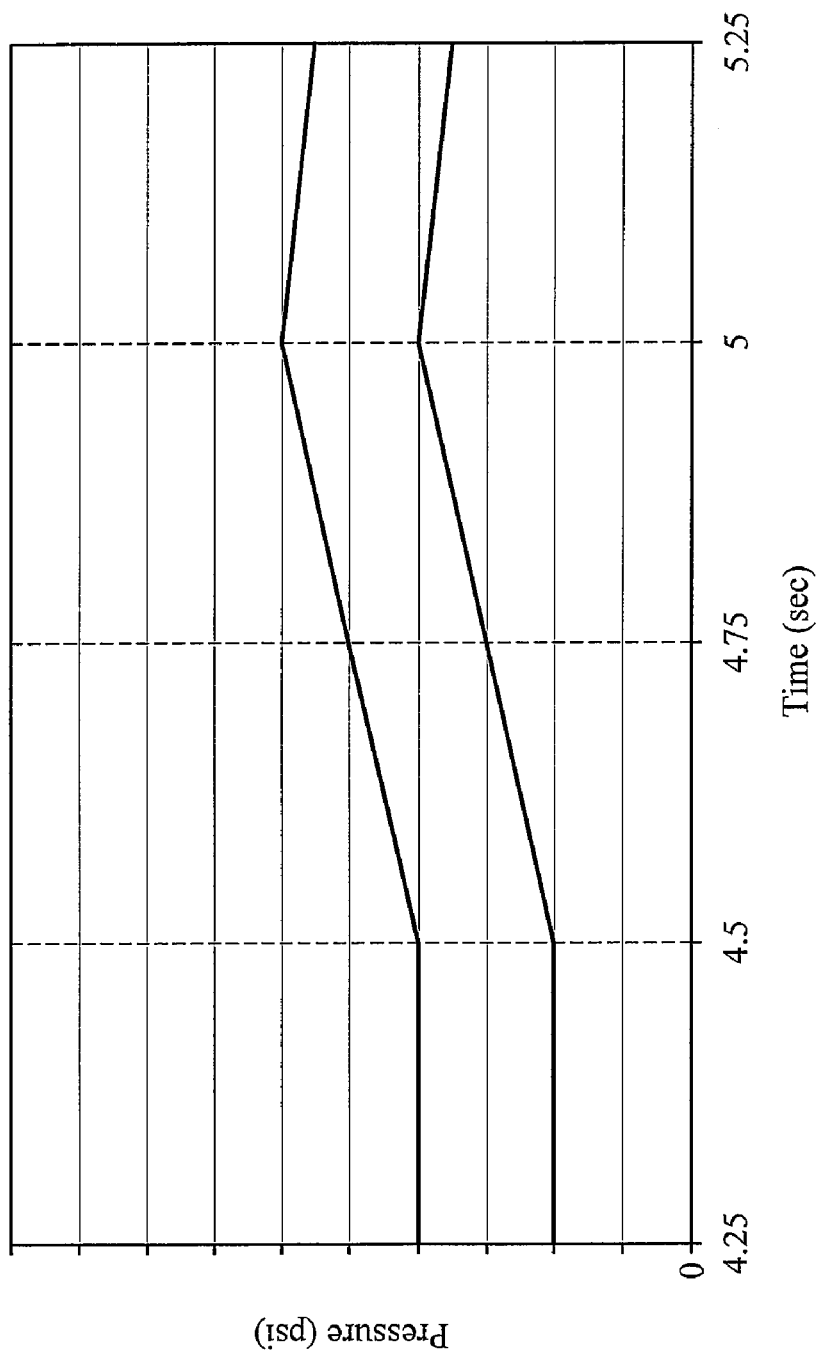
FIG. 4 shows a second pressure profile of the shot portion of a shot cycle.

FIG. 4 is a second pressure profile of the shot portion of a shot cycle. FIG. 4 differs from FIG. 3 in that $\Delta$Po and $\Delta$Pc have the same value, so that $\Delta\Delta$Poc is zero.

Figure 5:
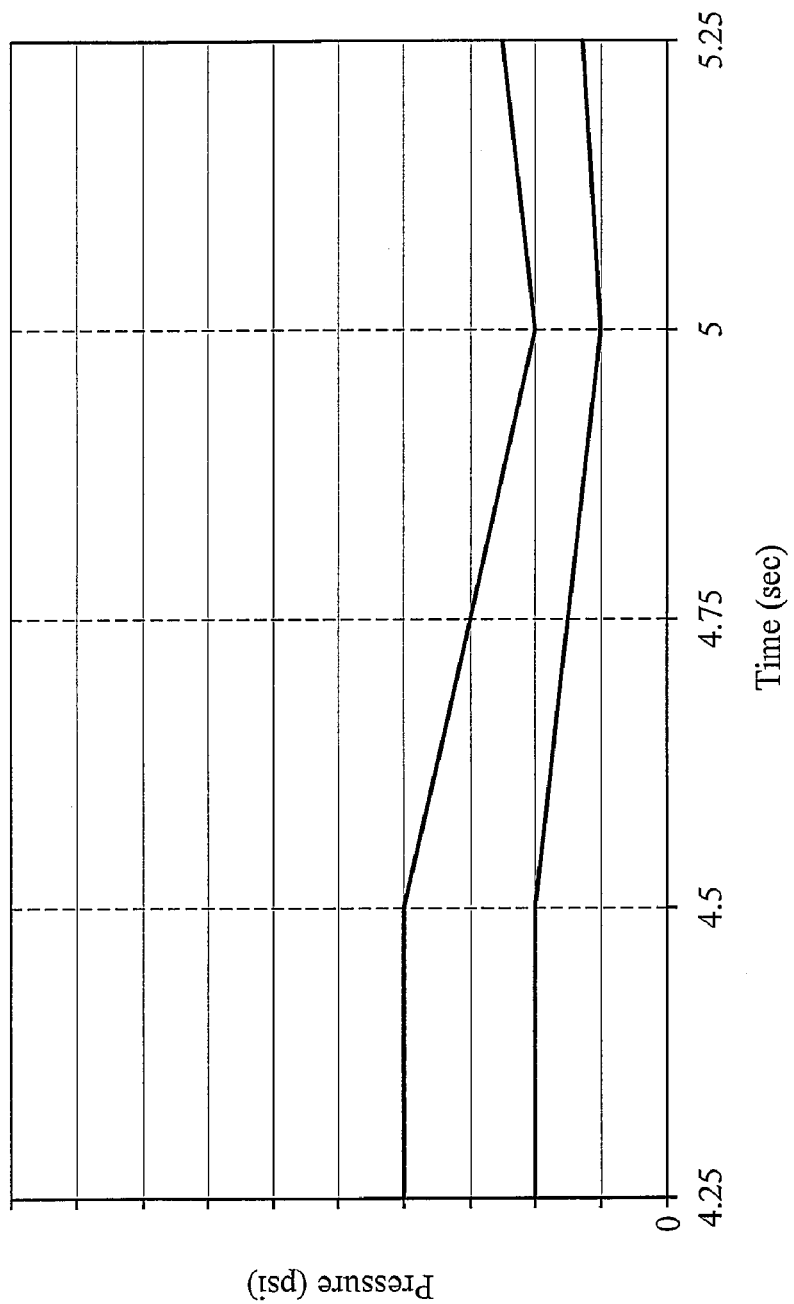
FIG. 5 shows a third pressure profile of the shot portion of a shot cycle.

FIG. 5 is a third pressure profile of the shot portion of a shot cycle. FIG. 5 differs from FIG. 3 in that $\Delta$Po is greater than $\Delta$Pc and the pressure of both reactants decreases throughout the shot portion.

Figure 6:
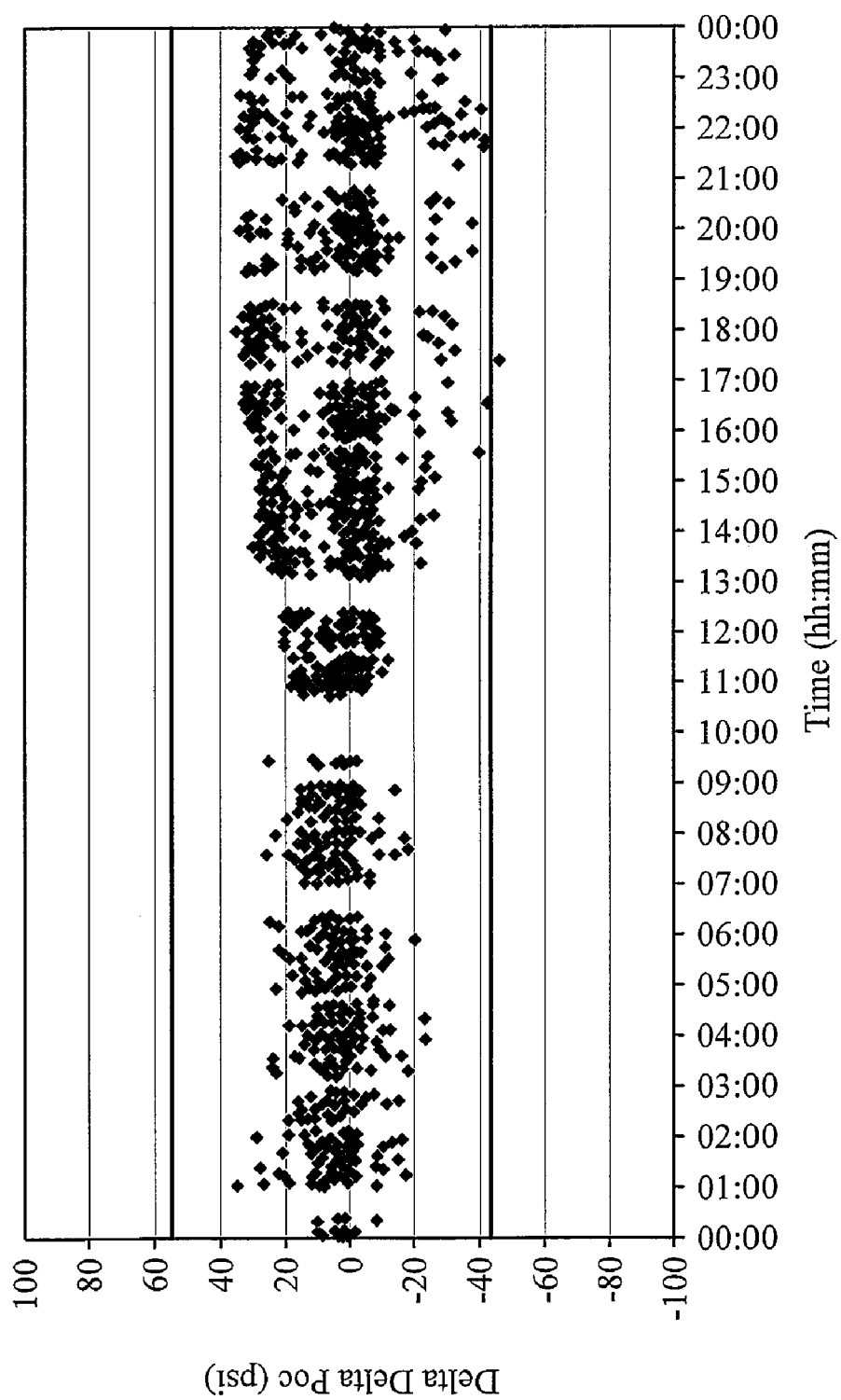
FIG. 6 shows a first shot history of a RIM machine used to make golf balls over 24 hours.
Figure 7:
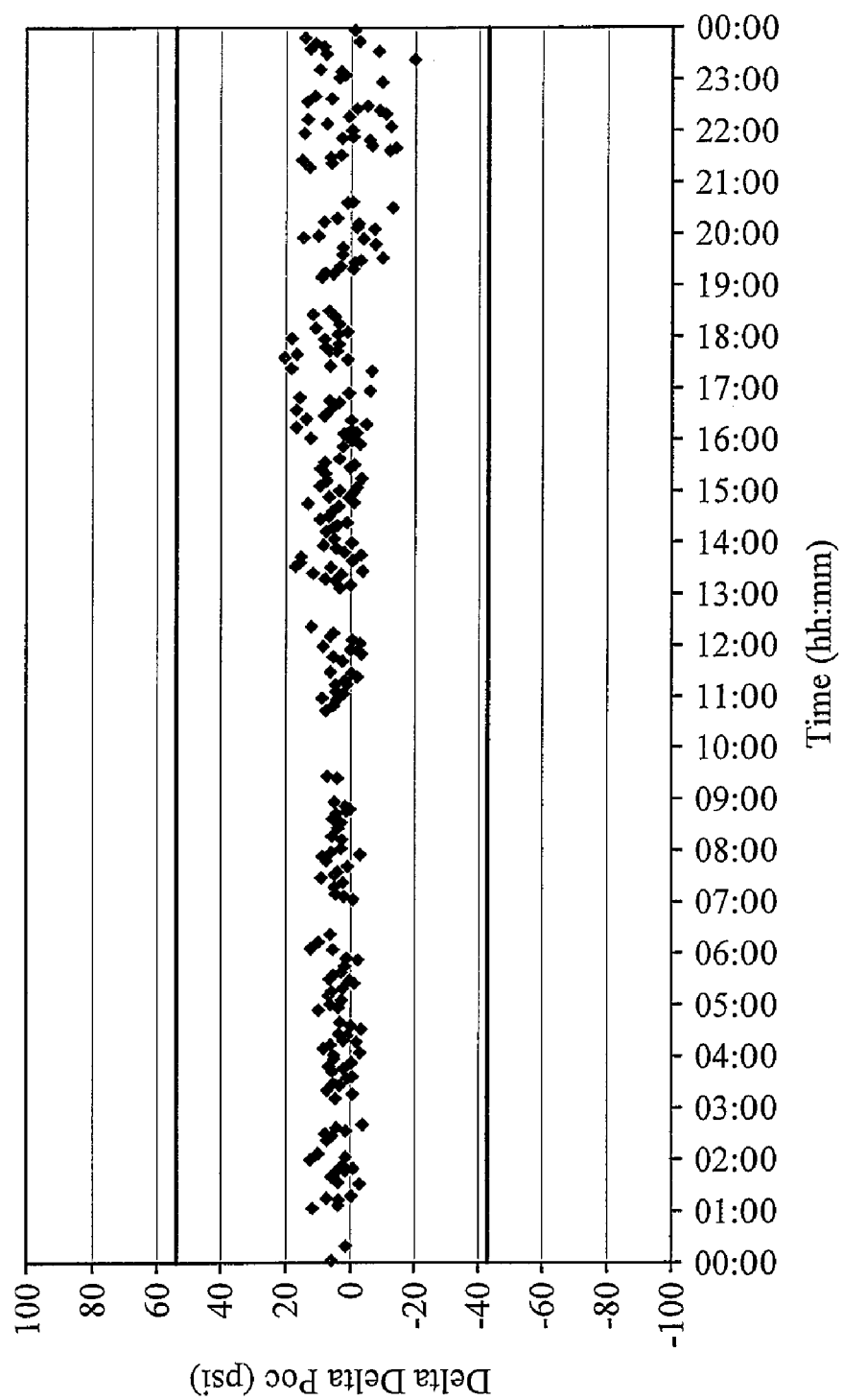
FIG. 7 shows the same shot history as FIG. 6, analyzed differently.

FIG. 6 shows a graph of a first shot history of a RIM machine used to make golfballs over 24 hours. The parameter measured was $\Delta\Delta$Poc FIG. 7 shows the same shot history as FIG. 6. In FIG. 7, the shots were divided into subgroups of six shots. This is reflected by the lower number of points on the graph.

Figure 8:
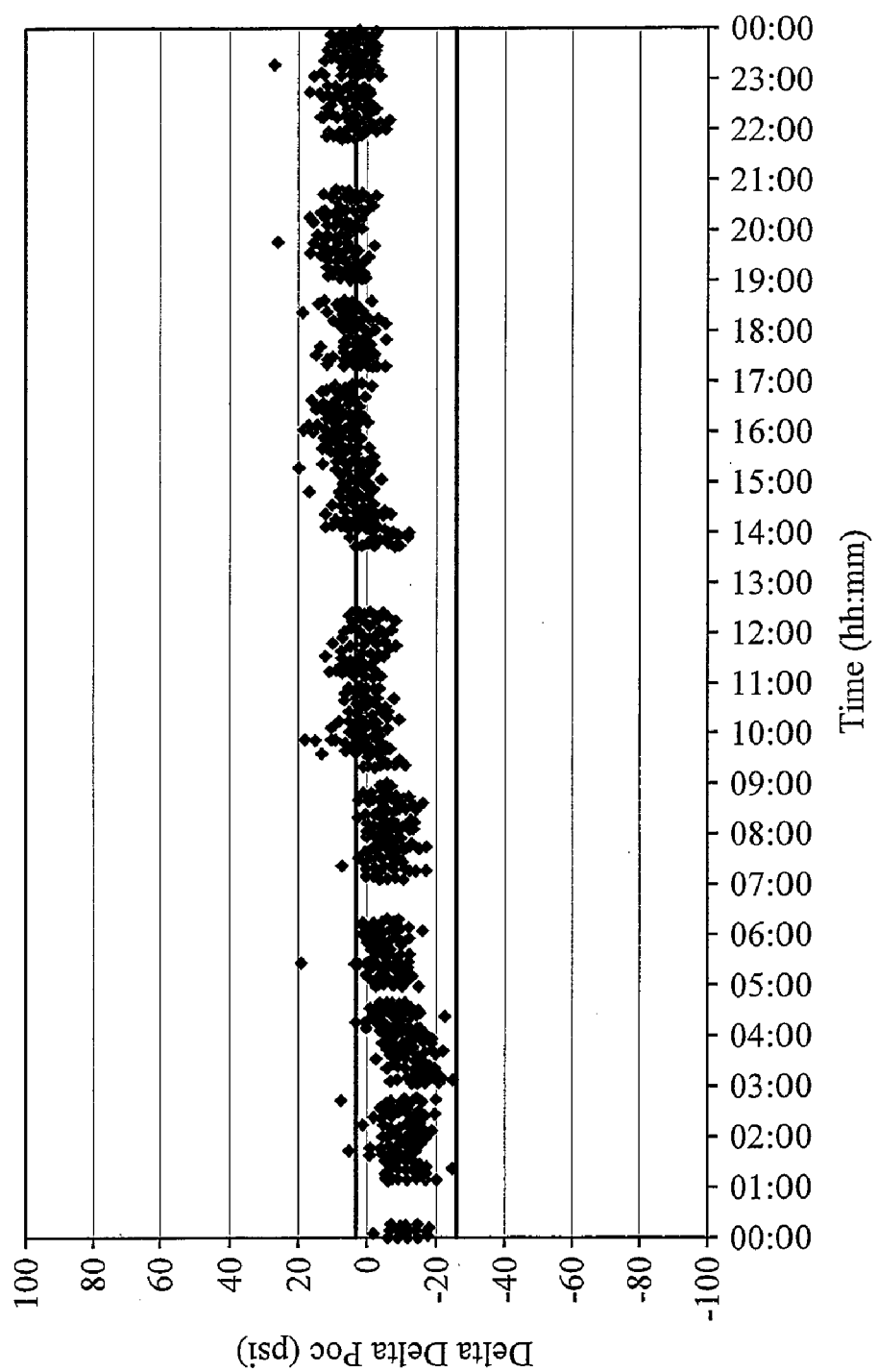
FIG. 8 shows a second shot history of a RIM machine used to make golf balls over 24 hours.

FIG. 8 shows a graph of a second shot history of a RIM machine used to make golfballs over 24 hours. The parameter measured was $\Delta\Delta$Poc. Note that the upper and lower bounds here are different from those of FIG. 6. In FIG. 8, the shots drift towards the upper bound.

Figure 9:
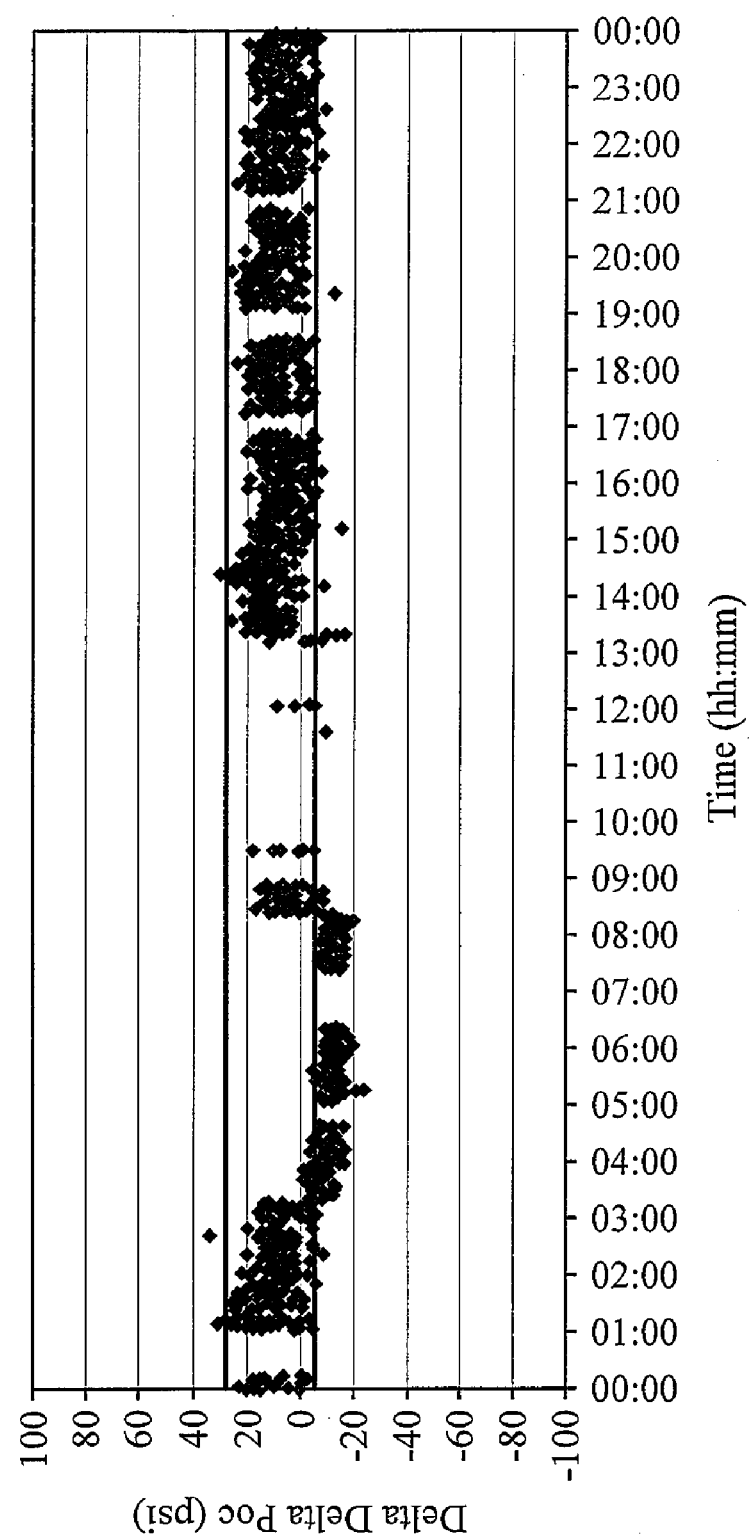
FIG. 9 shows a third shot history of a RIM machine used to make golf balls over 24 hours.

FIG. 9 shows a graph of a third shot history of a RIM machine used to make golfballs over 24 hours. The parameter measured was $\Delta\Delta$Poc.

Figure 10:
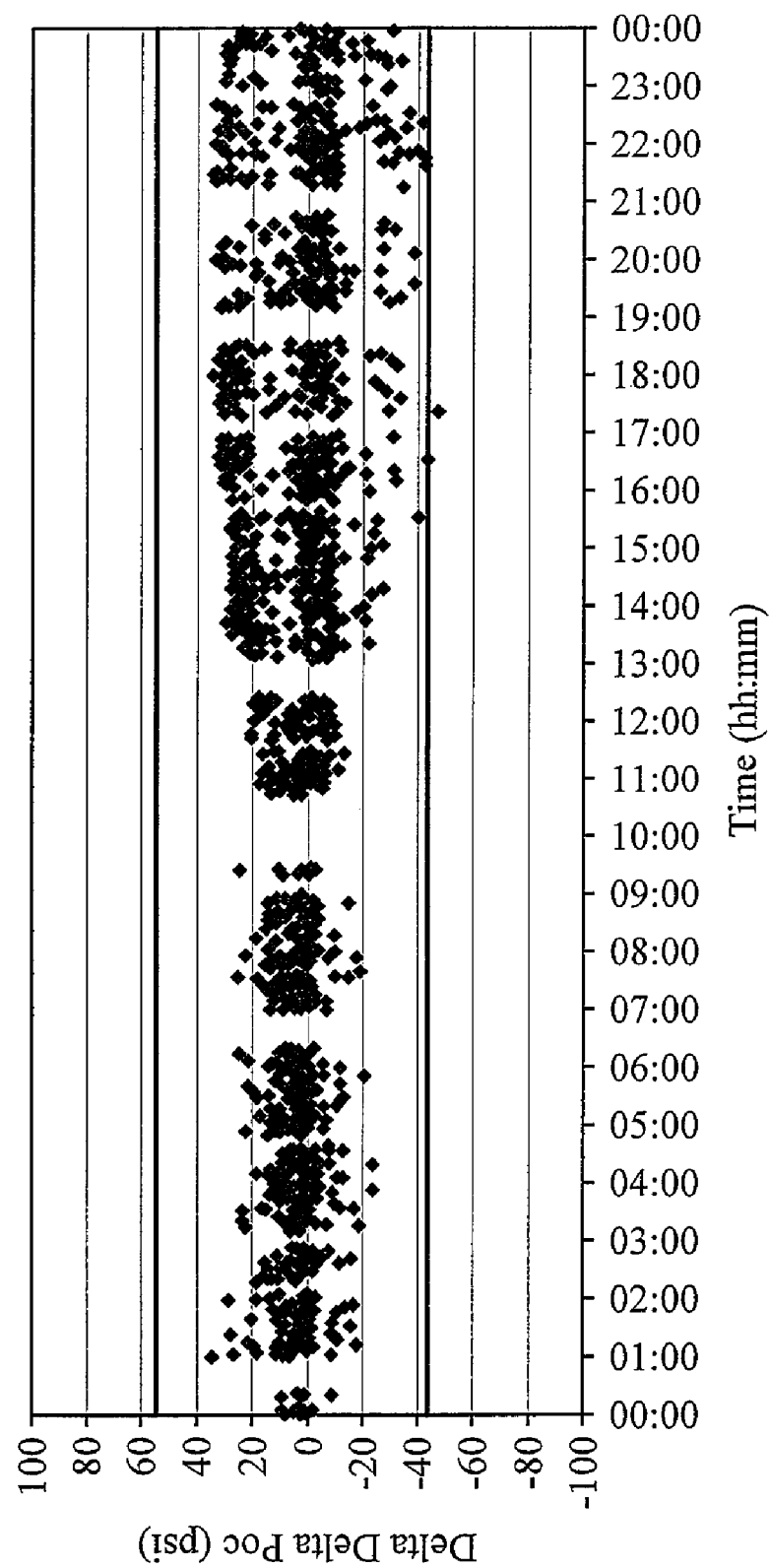
FIG. 10 shows a fourth shot history of a RIM machine used to make golf balls over 16 hours.

FIG. 10 shows a graph of a fourth shot history of a RIM machine used to make golf balls over 24 hours. The parameter measured was $\Delta\Delta$Poc.

Figure 11:
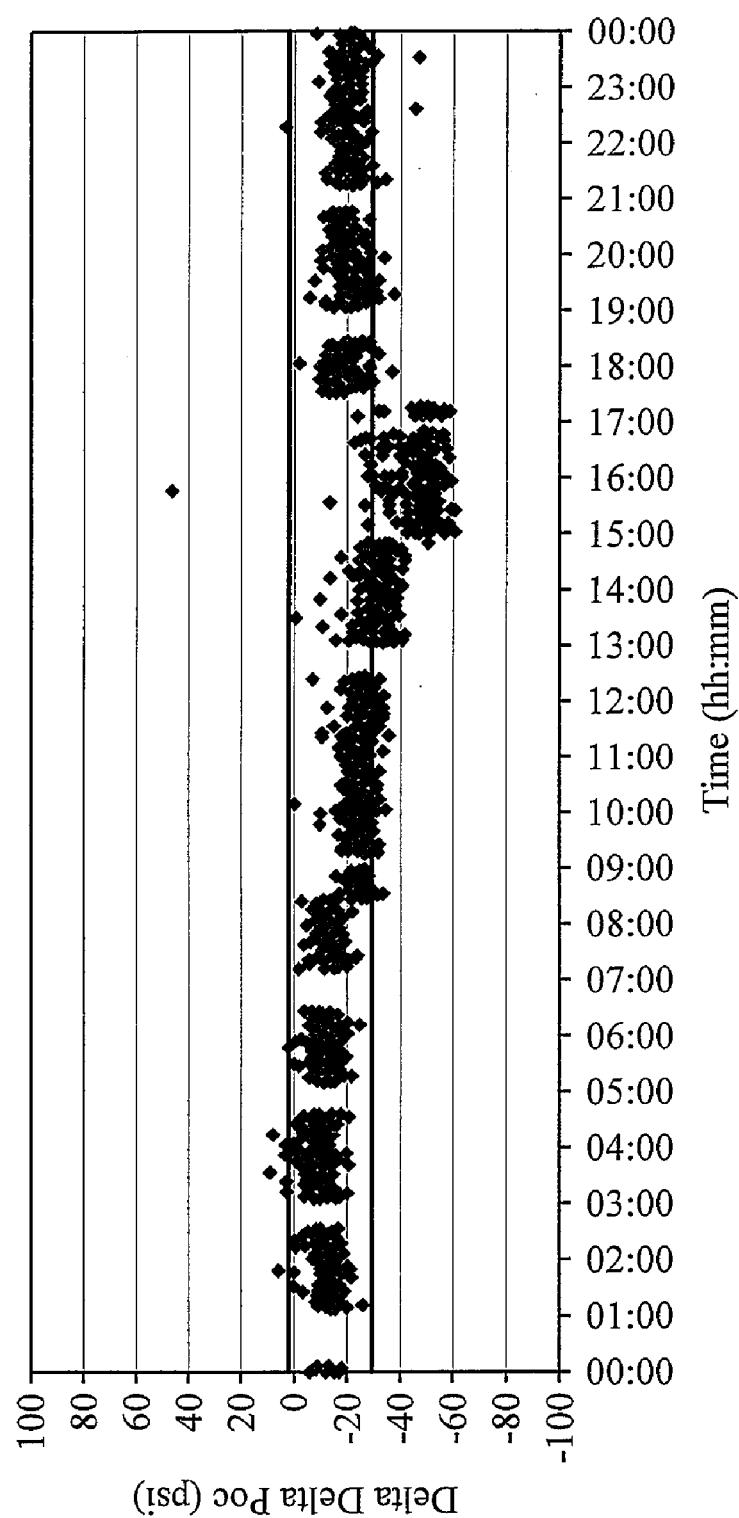
FIG. 11 shows a fifth shot history of a RIM machine used to make golf balls over 24 hours.

FIG. 11 shows a graph of a fifth shot history of a RIM machine used to make golf balls over 24 hours. The parameter measured was $\Delta\Delta$Poc.

Figure 12:
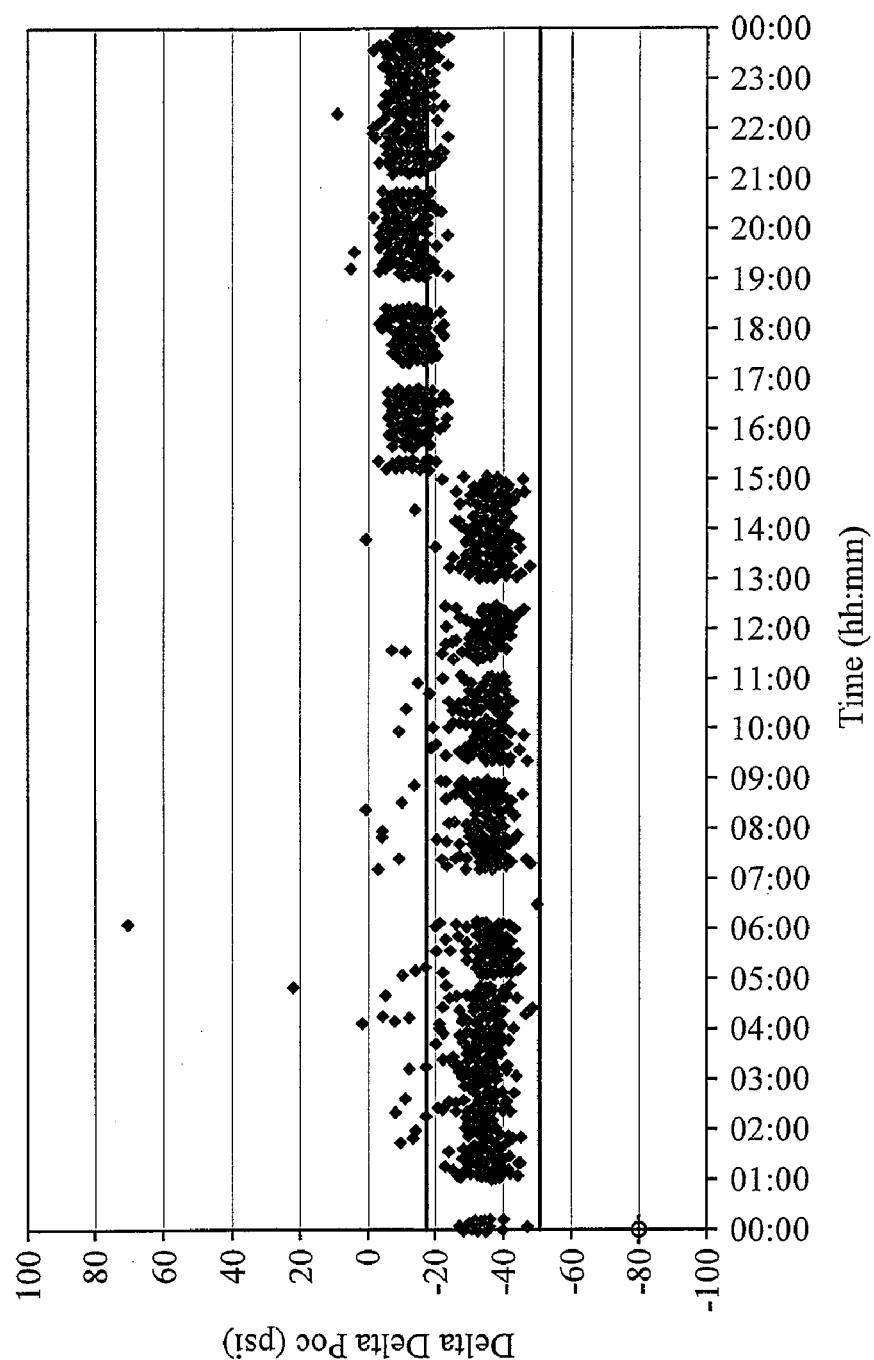
FIG. 12 shows a sixth shot history of a RIM machine used to make golf balls over 24 hours.

FIG. 12 shows a graph of a sixth shot history of a RIM machine used to make golf balls over 24 hours. The parameter measured was $\Delta\Delta$Poc. In FIG. 12, routine preventive maintenance was performed on the machine at approximately 15:00. The production runs before and after 15:00 show clear differences between their baseline central tendencies and natural variations. Again, the indicated upper and lower bounds are shown for the production run prior to 15:00.

Figure 13:
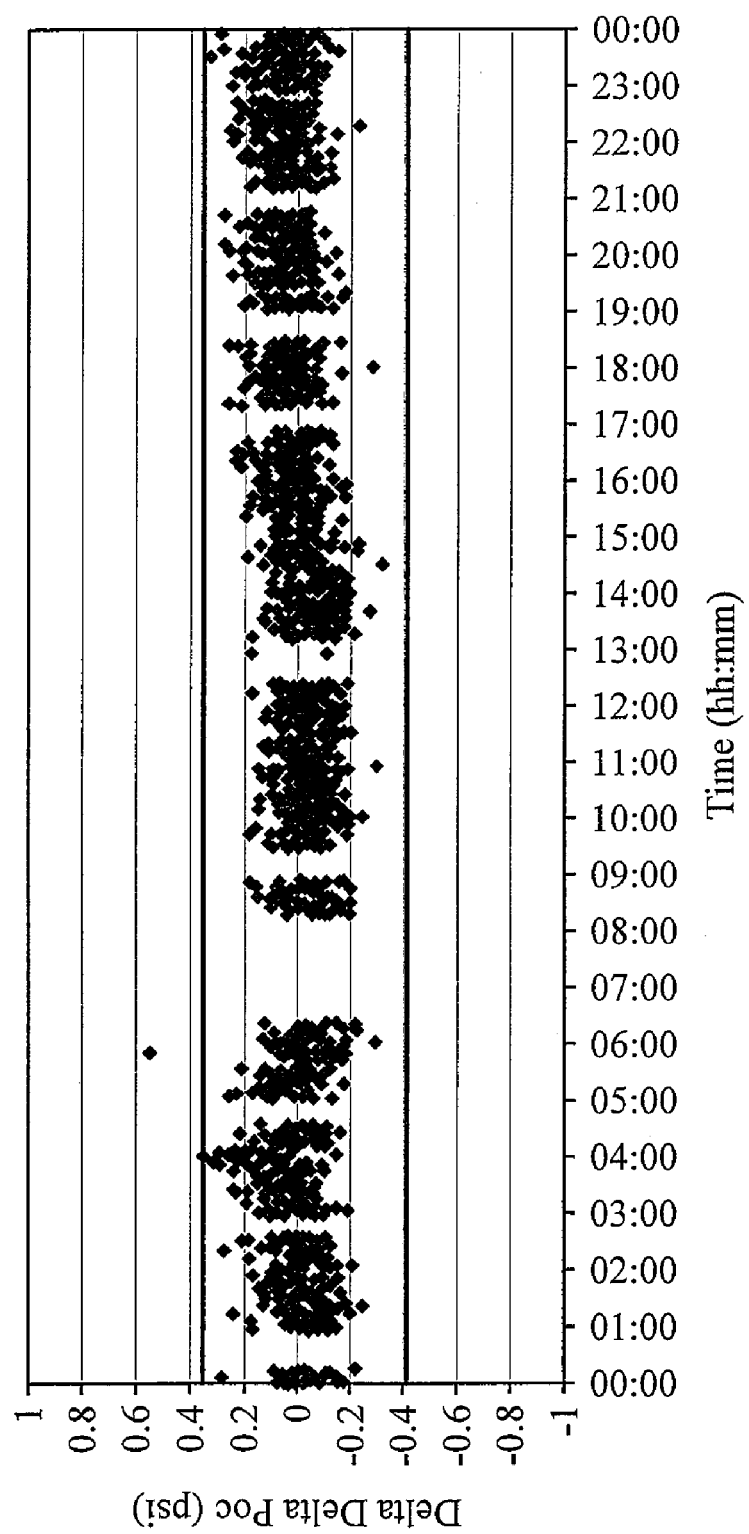
FIG. 13 shows a seventh shot history of a RIM machine used to make golf balls over 24 hours where the measured parameter is the change in mass flow rate ratio, $\Delta MFRoc$.

FIG. 13 shows a graph of a seventh shot history of a RIM machine used to make golf balls over 24 hours. The parameter measured was the change in mass flow rate ratio, $\Delta$MFRoc. The dark lines indicate the upper and lower bounds of an in-control process.

Over the course of any shot cycle (from points B to G in FIG. 2), the pressure at the end of that shot cycle for a reactant (point G) is preferably within 100 psi of the pressure at the beginning of that shot cycle for that reactant (point B). More preferably, it is within 50 psi, and most preferably it is within 10 psi.

Over the course of any shot cycle (from points B to G in FIG. 2), the pressure of the two reactants (ISO and POLY) at the end of that shot cycle (point G) is preferably within 700 psi of each other. More preferably, they are within 200 psi of each other, and most preferably they are within 100 psi of each other.

Over the course of any shot cycle (from points B to G in FIG. 2), the impingement velocity of a reactant into the mixhead is preferably within the range of 8 to 5000 ft/sec. More preferably, it is within the range of 50 to 2000 ft/sec, and most preferably it is within the range of 100 to 1000 ft/sec. Over the course of any shot cycle (from points B to G in FIG. 2), the Reynolds number of a reactant at impingement is preferably within the range of 1.3 to 2,500,000. More preferably, it is within the range of 3.2 to 630,000. Most preferably it is within the range of 9.5 to 440,000.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A process for reaction injection molding a layer for a golf ball, the process comprising:
   introducing a polyol component into a molding apparatus;
   introducing an isocyanate component into the molding apparatus; and
   forming a layer for a golf ball, the layer formed from the reaction product of the polyol component and the isocyanate component;
   wherein a pressure difference $\Delta\Delta Pom$ is less than 100 psi.

2. The process according to claim 1 wherein a pressure difference $\Delta\Delta Poc$ is less than 100 psi.

3. The process according to claim 1 wherein a Reynold's Number for the isocyanate component ranges from 5 to 500,000 and a Reynold's Number for the polyol component ranges from 5 to 500,000.

4. The process according to claim 1 wherein an impingement velocity for the isocyanate component ranges from 50 to 2,000 feet per second, and an impingement velocity for the polyol component ranges from 50 to 2,000 feet per second.

5. The process according to claim 1 wherein a pressure change of the polyol component during the process is less than 350 psi, and a pressure change of the isocyanate component during the process is less than 350 psi.

6. The process according to claim 1 wherein the change in mix ratio, % MFRom, from mix-head open to shot mid-point is within 10%.

7. The process according to claim 1 wherein a Reynold's Number for the isocyanate component ranges from 50 to 1,000 and a Reynold's Number for the polyol component ranges from 50 to 1,000.

8. The process according to claim 1 wherein an impingement velocity for the isocyanate component ranges from 100 to 1,000 feet per second, and an impingement velocity for the polyol component ranges from 100 to 1,000 feet per second.

9. The process according to claim 1 wherein the layer is a cover for the golf ball.

10. A process for reaction injection molding a layer for a golf ball, the process comprising:
    introducing a polyol component into a molding apparatus;
    introducing an isocyanate component into the molding apparatus;
    reacting the polyol component and the isocyanate component within the molding apparatus to create a reaction product; and
    forming a layer for a golf ball, the layer formed from the reaction product;
    wherein an impingement velocity for the isocyanate component ranges from 50 to 2,000 feet per second, and an impingement velocity for the polyol component ranges from 50 to 2,000 feet per second;
    wherein the change in a mix ratio % MFRoc is within 10%.

11. A process for reaction injection molding a layer for a golf ball, the process comprising:
    introducing a polyol component into a molding apparatus;
    introducing an isocyanate component into the molding apparatus;
    reacting the polyol component and the isocyanate component within the molding apparatus to create a reaction product; and
    forming a layer for a golf ball, the layer formed from the reaction product;
    wherein an impingement velocity for the isocyanate component ranges from 50 to 2,000 feet per second, and an impingement velocity for the polyol component ranges from 50 to 2,000 feet per second; wherein a pressure difference $\Delta\Delta Poc$ is less than 100 psi.

12. The process according to claim 10 wherein a Reynold's Number for the isocyanate component ranges from 5 to 500,000 and a Reynold's Number for the polyol component ranges from 5 to 500,000.

13. The process according to claim 10 wherein a pressure change of the polyol component during the process is less than 350 psi, and a pressure change of the isocyanate component during the process is less than 350 psi.

14. The process according to claim 10 wherein a Reynold's Number for the isocyanate component ranges from 50 to 1,000 and a Reynold's Number for the polyol component ranges from 50 to 1,000.

15. The process according to claim 10 wherein an impingement velocity for the isocyanate component ranges from 100 to 1,000 feet per second, and an impingement velocity for the polyol component ranges from 100 to 1,000 feet per second.

16. A process for reaction injection molding a layer for a golf ball, the process comprising:
    introducing a polyol component into a molding apparatus;
    introducing an isocyanate component into the molding apparatus; and
    forming a layer for a golf ball, the layer formed from the reaction product of the polyol component and the isocyanate component;
    wherein a pressure difference $\Delta\Delta Pom$ is less than 200 psi and a change in mix ratio, % MFRom, from mix-head open to shot mid-point is within 20%.

17. The process according to claim 16 wherein a pressure difference $\Delta\Delta Poc$ is less than 200 psi.

18. The process according to claim 16 wherein a Reynold's Number for the isocyanate component ranges from 5 to 500,000 and a Reynold's Number for the polyol component ranges from 5 to 500,000.

19. The process according to claim 16 wherein an impingement velocity for the isocyanate component ranges from 50 to 2,000 feet per second, and an impingement velocity for the polyol component ranges from 50 to 2,000 feet per second.

* * * * *